United States Patent
Parenti

[11] 3,738,772
[45] June 12, 1973

[54] OSCILLATING PLATE FOR HELICOPTERS

[75] Inventor: Giorgio Parenti, Parma, Italy

[73] Assignee: SIAI-Marchetti S.p.A., Varese, Italy

[22] Filed: Mar. 7, 1972

[21] Appl. No.: 232,395

Related U.S. Application Data

[63] Continuation-in-part of Ser. No. 23,067, March 26, 1970, abandoned.

[52] U.S. Cl. .................................................. 416/114
[51] Int. Cl. ............................................ B64c 27/74
[58] Field of Search ........................... 416/113–115

[56] References Cited
UNITED STATES PATENTS

| | | | |
|---|---|---|---|
| 3,134,444 | 5/1964 | Egerton et al. | 416/114 X |
| 3,322,200 | 5/1967 | Tresch | 416/112 |
| 3,545,880 | 12/1970 | Mouille | 416/114 |

FOREIGN PATENTS OR APPLICATIONS

| | | | |
|---|---|---|---|
| 711,456 | 6/1931 | France | 244/17.25 |

*Primary Examiner*—Everette A. Powell, Jr.
*Attorney*—Kurt Kelman

[57] ABSTRACT

A dynamic oscillating plate is disclosed for use on a helicopter. The plate includes the combination of an upper forged ring having an over-turned U hollow section, and a lower forged ring having a U hollow section which is dimensioned to mate internally with the over-turned U hollow section. The mating members form a rigid connection highly resistant to deflection and torsional forces when secured in mating position solely by engaging contact of mating arms of the U hollow sections, and without added mechanical engaging means.

2 Claims, 1 Drawing Figure

PATENTED JUN 12 1973 3,738,772
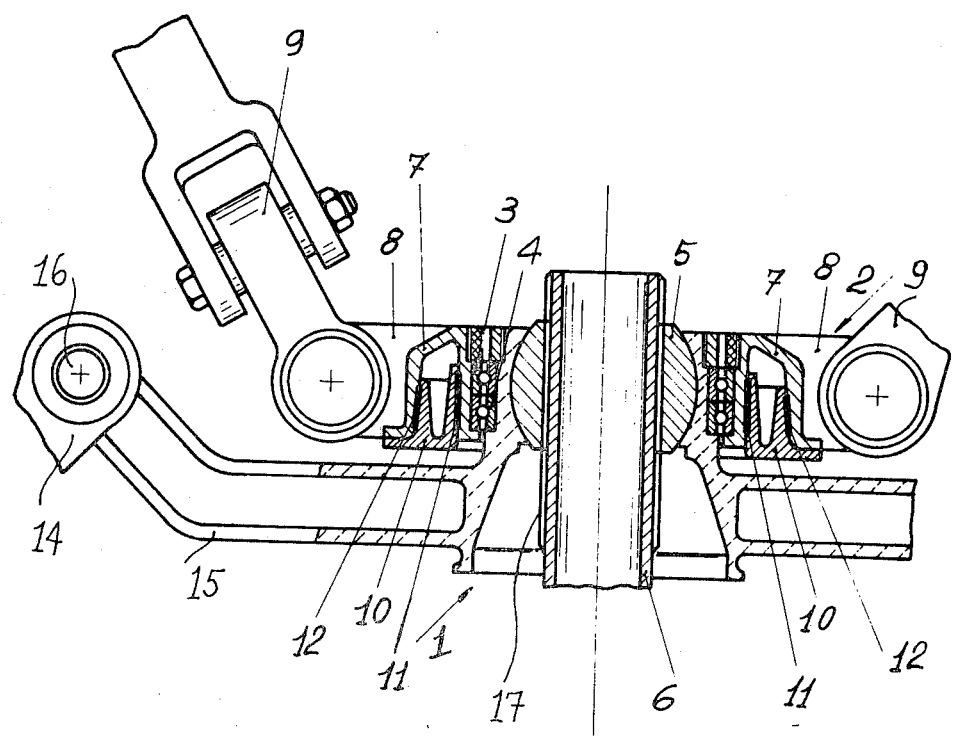

OSCILLATING PLATE FOR HELICOPTERS

The present application is a continuation-in-part of copending application Ser. No. 23,067, filed Mar. 26, 1970, now abandoned.

This invention relates to a dynamic oscillating plate for a helicopter, and more particularly to an oscillating plate formed of a simple combination of mating elements which provide a rigid connection highly resistant to deflection and torsional forces.

It is well known that two types of forces act on the rotation controls of helicopters. One of these forces is caused by static loads whereas the other is caused by reciprocating or dynamic loads. Dynamic loads occur during the service-life of the helicopter and accordingly are of major concern. The blades of the main rotor vary their cyclic and collective pitch by means of a control imparted to them through pitch control columns which are connected to the arms of the dynamic oscillating plate. The latter is engaged through bearings with an underlaying static oscillating plate, which is influenced by the pilot's governing pulses. The static oscillating plate is free to oscillate around its center and all infinite planes passing through it, and is comprised of a round-shaped center body with three arms joining the flight control columns. Owing to the rotation of the blades around the vertical axis of rotation and the variations in pitch, the loads imparted by the blades to the dynamic oscillating plate, through the control columns, will vary at any moment. This is actually the origin of dynamic loading.

The dynamic oscillating plate is subjected, owing to dissymmetry of the dynamic load flowing from the main rotor, to deflection not only attributable to concentrated load at the pitch control column fixing points, but also to rather high torsional stresses.

It is known that dynamic oscillating plates may be formed using casting or forging techniques. Casting permits the production of elements having closed hollow section, which can withstand very satisfactorily the torsional stresses, while showing a low ultimate tensile stress in particular under fatigue. Thus cast plates are useful only for light weight helicopters.

Where the flight characteristics are strict and the helicopters come within the average weight category, the oscillating loads are high, thus restricting use of castings unless they have large dimensions which are unacceptable because of weight and dimension factors. The dynamic oscillating plates made by forging techniques show characteristics which are slightly higher than for plates made by casting. However, use of forging techniques makes it impossible to prepare closed hollow sections. Thus, to get a practically indeformable dynamic oscillating plate using forging techniques, sections with large dimensions are required, again being unacceptable because of weight and dimension factors.

It has now been found, however, that numerous disadvantages of the prior art are overcome by the practice of the present invention wherein a simple combination of mating elements is provided which form a rigid connection highly resistant to deflection and torsional forces.

Generally stated, the present invention provides a dynamic oscillating plate which includes in combination, an upper forged ring having an overturned U-hollow section, flange members projecting outwardly from the hollow sections and forming coupling points for pitch control columns, and means projecting inwardly for engaging through bearing members with an oscillation spherical surface disposed relative to a vertical axis of a rotor; and a lower forged ring having a U-hollow section and dimensioned to mate internally with said overturned U hollow section, said mating forming a rigid connection highly resistant to deflection and torsional forces and secured in mating position solely by engaging contact of mating arms of the U hollow sections, and without added mechanical engaging means.

The mating elements of the present invention are forged separately. Optionally, mating of these elements may be further effected by means of chemical bonding. The mating elements thus include two rings associated one to the other and rigidly connected mechanically by mating, or optionally by chemical bonding. Slightly tapered surfaces of the lower ring mate in a manner such as to form a closed hollow section of forged materials. Thus, this simple unit avoids the disadvantages of the prior art, and moreover provides advantages including higher resistance to deflection and torsional forces, along with a lighter weight and smaller size dimensions.

In addition to the enhanced rigidity and improved fatigue strength, the present invention affords advantages such as reduction in number of parts and assembly means, thus lowering production costs, in improved durability, a saving in weight, and reductions in machining for joining and locking the arrangement.

Practice of the present invention is described in greater detail with reference to the attached figure which illustrates in vertical axial cross-section the present dynamic oscillating plate.

In the drawing, there is illustrated static oscillating lower plate 1 and upper dynamic oscillating plate 2. Non-rotating static plate 1, i.e., a swash plate portion, is prevented from rotating by a caliper 14 which is connected at one end to portion 15 via clevis 16 rigid therewith and at its other end to a fixed cover not shown but well known in the art such as illustrated, in detail, by Mouille in U. S. Pat. No. 3,545,880, portions of which are incorporated herein by reference where applicable.

Static plate 1 has ball bearings 3 and 4 mounted near one end thereof as illustrated, and opposite to these bearings, elements of this plate are mounted over oscillation spherical surface 5 disposed over fixed cylindrical sleeve 17. Sleeve 17 is fixed over rotor 6 by conventional means. The dynamic oscillating plate 2 comprises the present invention and includes upper ring 7 with overturned U hollow section which is forged with flange members 8 through bearing fixing points for pitch control columns 9, combined with lower ring 10 of U hollow cross-section also formed by forging. The inner surfaces of downwardly extending arms of overturned U hollow section 7 mate to house the outer surfaces of upwardly extending arms of hollow section 10. Although mating of the hollow section 7 with that of hollow section 10 is effected solely by engaging contact of the mating arms and without added mechanical engaging means such as bolts, welding and the like, it is optionally desirable to insure mating by chemical bonding means illustrated at areas 11 and 12 respectively. Chemical bonding is achieved by including an adhesive, resin, fluid material or the like which insures mating by eliminating minute voids between the mating surfaces, and further such binding may provide adhesive joining of the mating metal surfaces dependent upon the particular chemical material used. These materials such as metal adhesives are well known to the art, readily available commercially, and may be used herein as desired.

It will be apparent that the section formed by mating surfaces of the two coupled rings is hollow and closed while formed with forged pieces. Thus, the dynamic oscillating plate shows the advantages typical of the forged materials along with advantages of the closed hollow section, thus providing an oscillating plate for medium and large size helicopters, subjected to remarkable oscillations, however with reduced weight and reduced overall dimensions.

It is recognized that the shape of the hollow sections of the two forged rings may be varied, and mated as previously indicated.

It is to be understood that many changes and substitutions of parts may be made in the constructional form hereinbefore described, without departing from the scope of the invention.

What I claim is:

1. A dynamic oscillating plate for a helicopter which comprises in combination, an upper forged ring having an overturned U-hollow section, flange members projecting outwardly from the hollow sections and forming coupling points for pitch control columns, and means projecting inwardly for engaging through bearing members with an oscillation spherical surface disposed to a fixed sleeve relative to a vertical axis of a rotor; and a lower forged ring having a U-hollow section and dimensioned to mate internally with said overturned U-hollow section, said mating forming a rigid connection highly resistant to deflection and torsional forces and secured in mating position solely by engaging contact of mating arms of the U-hollow sections, and without added mechanical engaging means.

2. The dynamic oscillating plate of claim 1 wherein chemical bonding means is included between the mating surfaces.

* * * * *